(12) United States Patent
Sun et al.

(10) Patent No.: US 12,054,658 B2
(45) Date of Patent: Aug. 6, 2024

(54) MANUFACTURING METHOD OF OPTICAL FILM AND OPTICAL FILM

(71) Applicant: SHENZHEN CHINA STAR OPTOELECTRONICS SEMICONDUCTOR DISPLAY TECHNOLOGY CO., LTD., Shenzhen (CN)

(72) Inventors: Xiaowei Sun, Shenzhen (CN); Kai Wang, Shenzhen (CN); Miao Zhou, Shenzhen (CN); Hongcheng Yang, Shenzhen (CN); Pai Liu, Shenzhen (CN); Bing Xu, Shenzhen (CN); Lixuan Chen, Shenzhen (CN); Dongze Li, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 902 days.

(21) Appl. No.: 17/050,394

(22) PCT Filed: Sep. 15, 2020

(86) PCT No.: PCT/CN2020/115220
§ 371 (c)(1),
(2) Date: Oct. 23, 2020

(87) PCT Pub. No.: WO2022/027786
PCT Pub. Date: Feb. 10, 2022

(65) Prior Publication Data
US 2023/0174854 A1    Jun. 8, 2023

(30) Foreign Application Priority Data
Aug. 5, 2020 (CN) .......................... 202010778080.9

(51) Int. Cl.
*C09K 11/58* (2006.01)
*B82Y 30/00* (2011.01)
(Continued)

(52) U.S. Cl.
CPC .......... *C09K 11/582* (2013.01); *C09K 11/025* (2013.01); *C09K 11/621* (2013.01);
(Continued)

(58) Field of Classification Search
CPC ... C09K 11/025; C09K 11/582; C09K 11/621; C09K 11/661; C09K 11/70; C09K 11/881; F21V 9/30; C01G 23/006
See application file for complete search history.

(56) References Cited

U.S. PATENT DOCUMENTS

2019/0227431 A1* 7/2019 Park .................. G03F 7/028
2019/0390076 A1* 12/2019 Isonaka .............. C09D 11/50

FOREIGN PATENT DOCUMENTS

CN   101311377 A   11/2008
CN   105329938 A   2/2016
(Continued)

OTHER PUBLICATIONS

☐Polym Adv Technol.☐vol. 31 20191128 Fengmei Cheng, ETC. Preparation of polyimide/BaTiO3-nanocrystal hybrid thin films and their dielectric property p. 433-439
(Continued)

Primary Examiner — C Melissa Koslow
(74) Attorney, Agent, or Firm — PV IP PC; Wei Te Chung; Zhigang Ma (57) ABSTRACT

The present application discloses a manufacturing method of an optical film and the optical film. The manufacturing method includes: step S10, mixing titanium source precursors and a barium source and adding an alkaline agent for a reaction to obtain nanoparticles; and step S20, mixing quan-
(Continued)

Mixing titanium source precursors and a barium source and adding an alkaline agent for a reaction to obtain nanoparticles. — S10

Mixing quantum dots, an organic adhesive, and the nanoparticles followed by coating to obtain the optical film. — S20 tum dots, an organic adhesive, and the nanoparticles followed by coating to obtain the optical film.

11 Claims, 4 Drawing Sheets

(51) Int. Cl.
| | |
|---|---|
| *B82Y 40/00* | (2011.01) |
| *C01G 23/00* | (2006.01) |
| *C09K 11/02* | (2006.01) |
| *C09K 11/62* | (2006.01) |
| *C09K 11/66* | (2006.01) |
| *C09K 11/70* | (2006.01) |
| *C09K 11/88* | (2006.01) |
| *F21V 9/30* | (2018.01) |

(52) U.S. Cl.
CPC ............ *C09K 11/661* (2013.01); *C09K 11/70* (2013.01); *C09K 11/881* (2013.01); *F21V 9/30* (2018.02); *B82Y 30/00* (2013.01); *B82Y 40/00* (2013.01); *C01G 23/006* (2013.01)

(56) References Cited

FOREIGN PATENT DOCUMENTS

| | | |
|---|---|---|
| CN | 105778109 A | 7/2016 |
| CN | 107112398 A | 8/2017 |
| CN | 109161250 A | 1/2019 |
| CN | 109897449 A | 6/2019 |
| CN | 110072951 A | 7/2019 |
| CN | 110964504 A | 4/2020 |
| CN | 111302390 A | 6/2020 |
| CN | 111334151 A | 6/2020 |
| CN | 111363385 * | 7/2020 |
| CN | 111363385 A | 7/2020 |
| CN | 112010344 A | 12/2020 |
| JP | 2010030861 A | 2/2010 |
| JP | 2018090438 A | 6/2018 |
| KR | 100627632 B1 | 9/2006 |
| KR | 20160080280 A | 7/2016 |
| KR | 20190057563 A | 5/2019 |
| WO | 2016167448 A2 | 10/2016 |
| WO | WO 2018/123821 * | 7/2018 |

OTHER PUBLICATIONS

International Search Report in International application No. PCT/CN2020/115220, mailed on Apr. 28, 2021.
Written Opinion of the International Searching Authority in International application No. PCT/CN2020/115220, mailed on Apr. 28, 2021.
Chinese Office Action issued in corresponding Chinese Patent Application No. 202010778080.9 dated May 18, 2021, pp. 1-6.

* cited by examiner

MANUFACTURING METHOD OF OPTICAL FILM AND OPTICAL FILM

RELATED APPLICATIONS

This application is a Notional Phase of PCT Patent Application No. PCT/CN2020/115220 having international filing date of Sep. 15, 2020, which claims the benefit of priority of Chinese Patent Application No. 202010778080.9 filed on Aug. 5, 2020. The contents of the above applications are all incorporated by reference as if fully set forth herein in their entirety.

FIELD OF INVENTION

The present application is related to the field of display technology, and specifically, to a manufacturing method of an optical film and the optical film.

BACKGROUND OF INVENTION

Quantum dot materials are semiconductor materials, and their principle of light emission is to excite the quantum dot materials through electricity or light, wherein the quantum dot materials will emit light of a specific wavelength. Wavelengths can be adjusted by changing sizes of quantum dots to achieve precise control of wavelengths of emitted light. These two characteristics make the quantum dot materials an ideal material for displays. Meanwhile, compared with organic light-emitting materials, quantum dot materials have better light-emitting stability and strong aging resistance.

SUMMARY OF INVENTION

The present application provides a manufacturing method of an optical film and the optical film, which can reduce a content of quantum dots in the optical film, increase a brightness of the optical film, and enhance blue light absorption and scattering capabilities of the optical film.

The manufacturing method of the optical film provided by the present application includes steps of:
- step S10, mixing titanium source precursors and a barium source and adding an alkaline agent for a reaction to obtain nanoparticles; and
- step S20, mixing quantum dots, an organic adhesive, and the nanoparticles followed by coating to obtain the optical film.

In an embodiment of the present application, in step S10, the titanium source precursors include tetrabutyl titanate; the barium source includes barium carboxylate or barium acetylacetonate; and the alkaline agent includes potassium hydroxide, sodium hydroxide, or ammonia solution.

In an embodiment of the present application, the barium carboxylate includes barium myristate, barium palmitate, barium octadecenoate, or barium oleate.

In an embodiment of the present application, step S10 further includes: dissolving the titanium source precursors in a first solvent to form a first solution; dissolving the barium source in a second solvent to form a second solution; and mixing the first solution and the second solution.

In an embodiment of the present application, the first solvent and the second solvent are independently selected from one of dodecanethiol, oleic acid, oleylamine, ethylene glycol, ethanol, ultrapure water, or octadecene.

In an embodiment of the present application, in step S20, the quantum dots include indium phosphide quantum dots, perovskite quantum dots, indium copper sulfide quantum dots, silver sulfide quantum dots, lead sulfide quantum dots, or lead selenide quantum dots; and material of the organic adhesive includes an acrylic material or an epoxy resin material.

In an embodiment of the present application, in step S10, a molar ratio of barium element in the barium source to titanium element in the titanium source precursors ranges from 0.5 to 1.5.

In an embodiment of the present application, in step S20, a mass ratio of the quantum dots to the organic adhesive ranges from 0.1:100 to 5:100; and a mass ratio of the nanoparticles to the organic adhesive is 5:100.

In an embodiment of the present application, in step S20, the optical film includes a first organic layer, a mixed layer, and a second organic layer, which are stacked; and the mixed layer is obtained by mixing the quantum dots, the organic adhesive, and the nanoparticles.

According to the above purpose, the present application provides an optical film, which included barium titanate nanoparticles distributed in the optical film.

In an embodiment of the present application, the optical film further includes a first organic layer, a mixed layer, and a second organic layer, which are stacked. The mixed layer is obtained by mixing quantum dots, an organic adhesive, and nanoparticles.

In an embodiment of the present application, the nanoparticles include the barium titanate nanoparticles.

In an embodiment of the present application, material of each of the first organic layer and the second organic layer includes polyethylene terephthalate.

In an embodiment of the present application, the quantum dots include indium phosphide quantum dots, perovskite quantum dots, indium copper sulfide quantum dots, silver sulfide quantum dots, lead sulfide quantum dots, or lead selenide quantum dots. Material of the organic adhesive includes an acrylic material or an epoxy resin material.

Compared with the prior art, the present application adds the nanoparticles with brightness enhancement and dispersibility obtained by the reaction of titanium source precursors and barium source in the optical film, so as to reduce a direct transmission of blue light through the optical film and increase a back and forth reflection of the blue light in the optical film. In this way, the quantum dots fully absorb the blue light, so the quantum dots in the optical film are fully excited to increase luminous efficiency of the optical film, increase a luminous brightness of the optical film, and enhance blue light absorption and scattering capabilities of the optical film. Also, due to a good dispersibility of nanoparticles, uniformity of the optical film is increased.

DESCRIPTION OF DRAWINGS

The following describes specific embodiments of the present application in detail with reference to the accompanying drawings, which will make technical solutions and other beneficial effects of the present application obvious.

DETAILED DESCRIPTION OF PREFERRED EMBODIMENTS

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the of the present application.

In the description of the present application, it should be explained that the terms "center", "portrait", "transverse", "length", "width", "thickness", "upper", "lower", "front", "back", "left", "right", "vertical", "horizontal", "top", "bottom", "inside", "outside", etc. are based on the drawings. The orientation or positional relationship is only for the convenience of describing the present application and simplifying the description, and does not indicate or imply that the device or element referred to must have a specific orientation, structure and operation in a specific orientation, and should not be viewed as limitations of the present application. In addition, terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "multiple" is two or more, unless specifically defined otherwise.

In the description of the present application, it should be explained that terms "installation", "link", and "connection" should be understood broadly, unless explicitly stated and limited otherwise. For example, connection can be fixed connection or removable or integral connection, can be mechanical connection, electrical connection or mutual communication, can be direct connection or indirect connection through an intermedium, or can be the internal communication between two components or the mutual reaction between two components. For a skilled person in the art, the specific meanings of the above terms of the present application can be understood according to practical situations.

In the present application, unless explicitly stated and limited, the first feature is "on" or "under" the second feature may refer to that the first feature and second feature are directly contact, or are indirectly through another feature between them. Moreover, the first feature is "above", "upon", and "upper" the second feature, including that the first feature is directly above and obliquely above the second feature refers to that t the first feature is higher in level than the second feature. The first feature is "below", "down", and "under" of the second feature refers to that the first feature is directly below or obliquely below the second feature, or merely refers to that the first feature is horizontally lower than the second feature.

The following application provides many different embodiments or examples for implementing different structures of the present application. To simplify the application of the present application, the components and settings of specific examples are described below. Obviously, these are merely examples instead of limitation of the present application. Furthermore, the present application may repeat reference numbers and/or reference letters in different examples, and such repetition is for the purpose of simplicity and clarity, and does not indicate the relationship between the various embodiments and/or settings. Moreover, the present application provides examples of various specific processes and materials, but the applicability of other processes and/or application of other materials may be appreciated by a person skilled in the art.

Figure 1:
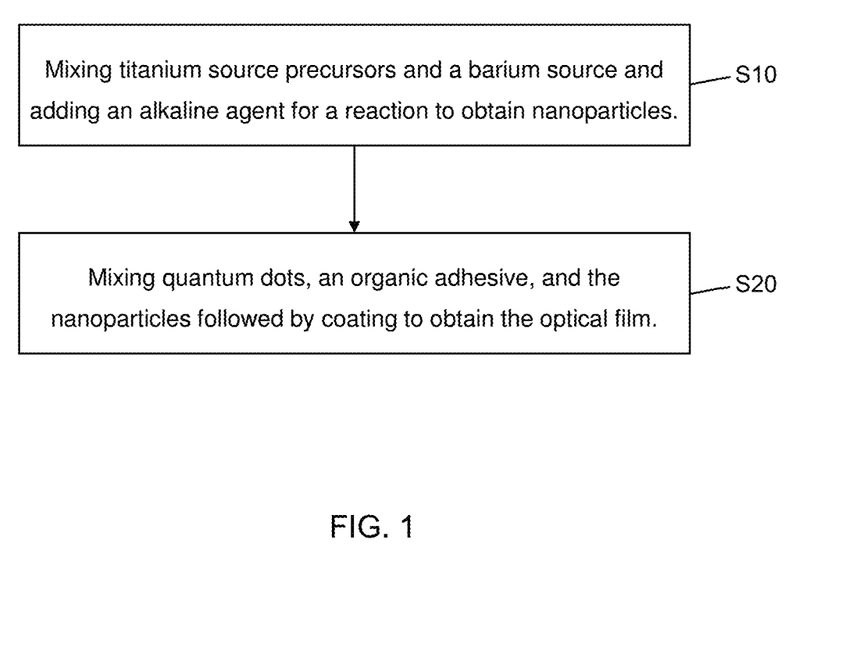
FIG. 1 is a flowchart of a manufacturing method of an optical film provided by an embodiment of the present application.

Please refer to FIG. 1. A manufacturing method of an optical film provided by the present application includes steps of:

step S10, mixing titanium source precursors and a barium source and adding an alkaline agent for a reaction to obtain nanoparticles; and step S20, mixing quantum dots, an organic adhesive, and the nanoparticles followed by coating to obtain the optical film.

In an actual implementation, an optical film in the prior art contains heavy metals in quantum dots, which limits a use of the quantum dots. However, reducing a content of the quantum dots in the optical film reduces an optical performance of the optical film. It is difficult to balance the above two factors. Therefore, adding high brightness enhancement materials to the optical film can solve the above technical problems. In an embodiment of the present application, barium titanate nanoparticles are added when manufacturing the optical film, so as to reduce the content of the quantum dots in the optical film and increase the optical performance of the optical film. Besides, by modifying surfaces of the barium titanate nanoparticles with organic carbon chains, a compatibility of the barium titanate nanoparticles in an organic adhesive is increased, which means that uniformity of the optical film is increased.

Please refer to FIG. 1. Furthermore, step S10 further includes: dissolving the titanium source precursors in a first solvent to form a first solution; dissolving the barium source in a second solvent to form a second solution; and mixing the first solution and the second solution. The first solvent and the second solvent are independently selected from one of dodecanethiol, oleic acid, oleylamine, ethylene glycol, ethanol, ultrapure water, or octadecene.

In step S10, the titanium source precursors include tetrabutyl titanate, the barium source includes barium carboxylate or barium acetylacetonate, and the alkaline agent includes potassium hydroxide, sodium hydroxide, or ammonia solution. A molar ratio of barium element in the barium source to titanium element in the titanium source precursors ranges from 0.5 to 1.5. In addition, the barium carboxylate includes barium myristate, barium palmitate, barium octadecenoate, or barium oleate, or can be adjusted to an actual situation to select carbon chains having the barium source for reaction.

The nanoparticles obtained by a reaction in step S10 are the barium titanate nanoparticles, its reaction temperature ranges from 180° C. to 300° C., and its reaction time ranges from 4 hrs to 30 hrs.

In step S20, the quantum dots include indium phosphide quantum dots, perovskite quantum dots, indium copper sulfide quantum dots, silver sulfide quantum dots, lead sulfide quantum dots, or lead selenide quantum dots; and material of the organic adhesive includes an acrylic material or an epoxy resin material.

A mass ratio of the quantum dots to the organic adhesive ranges from 0.1:100 to 5:100. A mass ratio of the nanoparticles to the organic adhesive is 5:100.

In addition, the optical film finally obtained in step S20 includes a first organic layer, a mixed layer, and a second organic layer, which are stacked. The mixed layer is obtained by mixing the quantum dots, the organic adhesive, and the nanoparticles. Material of each of the first organic layer and the second organic layer can be polyethylene terephthalate (PET).

The optical film obtained by the manufacturing method provided by an embodiment of the present application can be applied in a display device. The manufacturing method provided by an embodiment of the present application avoids using barium hydroxide to prepare the barium titanate nanoparticles like the prior art, which is not conducive to a dispersion of the barium titanate nanoparticles in the organic adhesive. Because the barium titanate nanoparticles prepared from the barium hydroxide are hydrophilic, they cannot be used in the optical film. However, an embodiment of the present application uses the barium source to prepare the barium titanate nanoparticles and modifies surfaces of the barium titanate nanoparticles with organic carbon chains, so as to increase the compatibility of the barium titanate nanoparticles in the organic adhesive, thereby obtaining a uniform optical film. Due to brightness enhancement of the barium titanate nanoparticles, a brightness and an optical performance of the optical film are increased when a content of the quantum dots is reduced. Also, due to a scattering effect of the barium titanate nanoparticles, a direct transmission of blue light through the film is reduced, and a back and forth reflection of the blue light in the optical film is increased. In this way, the quantum dots fully absorb the blue light, so that the quantum dots in the film are fully excited, thereby increasing a brightness of the optical film.

Specifically, the manufacturing method of the optical film provided by the present application is described in detail below with reference to specific embodiments.

First Embodiment

The titanium source precursors are tetrabutyl titanate, the barium source is the barium carboxylate, and both the first solvent and the second solvent are ethanol.

Specifically, the tetrabutyl titanate is dispersed in 15 mL ethanol, and the barium carboxylate is dispersed in 15 mL ethanol. Then, the above two solutions are mixed according to the molar ratio of barium element to titanium element of 1:1. After 2 mL of concentrated ammonia solution is added followed by stirring, the solution is placed in an autoclave to react at high temperature and high pressure for 10 hrs, where a reaction temperature is 200° ° C.

After the above reaction is completed, a reaction product is cooled to room temperature, and subjected to separation, purification, and freeze drying to obtain a corresponding powder, which is the barium titanate nanoparticles.

The quantum dots and the acrylic adhesive are mixed in a mass ratio of 1:100, and 5.0 wt % barium titanate nanoparticles are added at a same time, which means that a mass ratio of the barium titanate nanoparticles to the acrylic adhesive is 5:100. Finally, the above mixture is formed into the optical film with a thickness of 120 microns by a coating equipment. The optical film includes a first PET layer, the mixed layer, and a second PET layer. The mixed layer is obtained by mixing the quantum dots, the organic adhesive, and the nanoparticles. A thickness of each of the first PET layer and the second PET layer is 25 microns, and a thickness of the mixed layer is 70 microns.

Second Embodiment

The titanium source precursors are tetrabutyl titanate, the barium source is the barium carboxylate, the first solvent is ethanol, and the second solvent is octadecene.

Specifically, the tetrabutyl titanate is dispersed in 15 mL ethanol, and the barium carboxylate is dispersed in 15 mL octadecene. Then, the above two solutions are mixed according to the molar ratio of barium element to titanium element of 1:1. After 2 mL of concentrated ammonia solution is added followed by stirring, the solution is placed in the autoclave to react at high temperature and high pressure for 10 hrs, where the reaction temperature is 200° C.

After the above reaction is completed, the reaction product is cooled to room temperature, and subjected to separation, purification, and freeze-drying to obtain the corresponding powder, which is the barium titanate nanoparticles.

The quantum dots and the acrylic adhesive are mixed in the mass ratio of 1:100, and 5.0 wt % barium titanate nanoparticles are added at the same time, which means that the mass ratio of the barium titanate nanoparticles to the acrylic adhesive is 5:100. Finally, the above mixture is formed into the optical film with the thickness of 120 microns by the coating equipment. The optical film includes the first PET layer, the mixed layer, and the second PET layer. The mixed layer is obtained by mixing the quantum dots, the organic adhesive, and the nanoparticles. The thickness of each of the first PET layer and the second PET layer is 25 microns, and the thickness of the mixed layer is 70 microns.

Third Embodiment

The titanium source precursors are tetrabutyl titanate, the barium source is the barium acetylacetonate, the first solvent is ethanol, and the second solvent is ultrapure water.

Specifically, the tetrabutyl titanate is dispersed in 15 mL ethanol, and the barium acetylacetonate is dispersed in 15 mL octadecene. Then, the above two solutions are mixed according to the molar ratio of barium element to titanium element of 1:1. After the ammonia solution is added to adjust a pH value of the solution to 10 followed by stirring, it is placed in the autoclave to react at high temperature and high pressure for 10 hrs, where the reaction temperature is 200° C.

After the above reaction is completed, the reaction product is cooled to room temperature, and subjected to separation, purification, and freeze-drying to obtain the corresponding powder, which is the barium titanate nanoparticles.

The quantum dots and the acrylic adhesive are mixed in the mass ratio of 1:100, and 5.0 wt % barium titanate nanoparticles are added at the same time, which means that the mass ratio of the barium titanate nanoparticles to the acrylic adhesive is 5:100. Finally, the above mixture is formed into the optical film with the thickness of 120 microns by the coating equipment. The optical film includes the first PET layer, the mixed layer, and the second PET layer. The mixed layer is obtained by mixing the quantum dots, the organic adhesive, and the nanoparticles. The thickness of each of the first PET layer and the second PET layer is 25 microns, and the thickness of the mixed layer is 70 microns.

Figure 2:
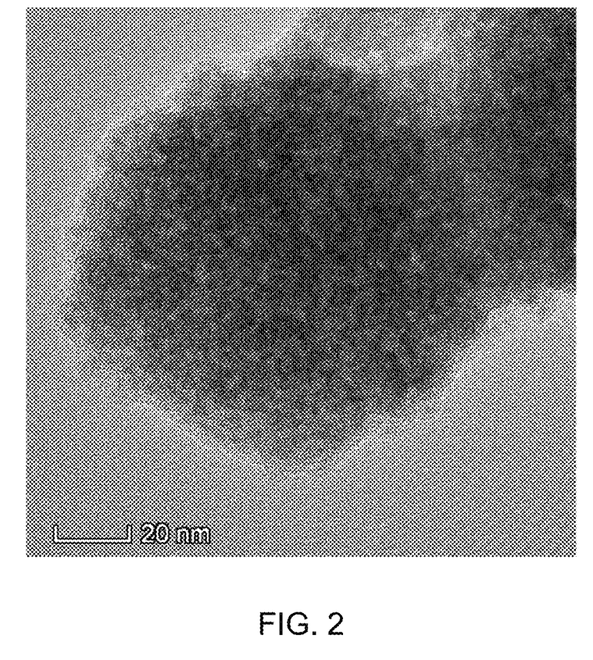
FIG. 2 is a transmission electron microscope micrograph provided by a first embodiment of an embodiment of the present application.
Figure 3:
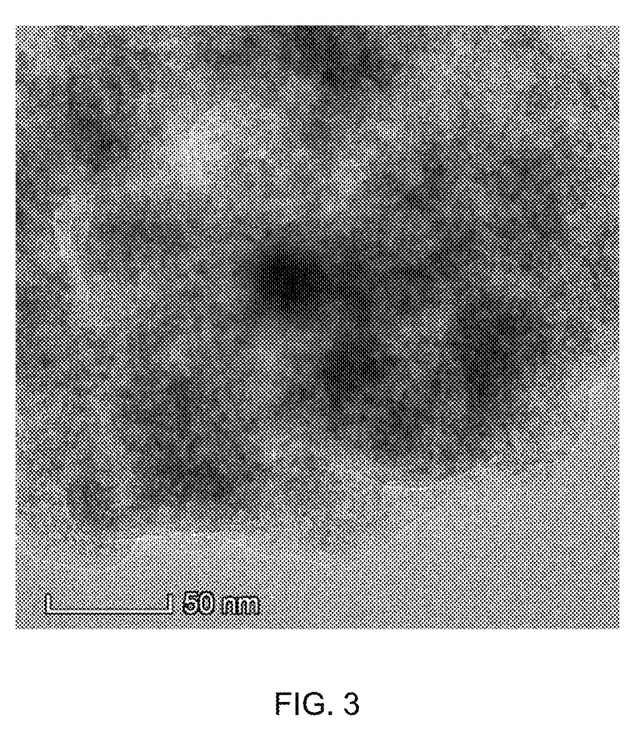
FIG. 3 is a transmission electron microscope micrograph provided by a second embodiment of an embodiment of the present application.
Figure 4:
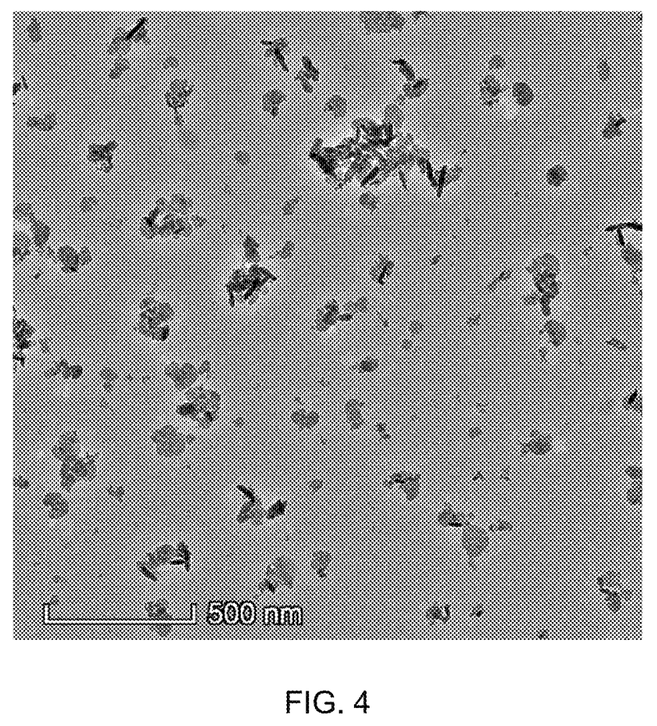
FIG. 4 is a transmission electron microscope micrograph provided by a third embodiment of an embodiment of the present application.

FIGS. 2, 3, and 4 provided by an embodiment of the present application are transmission electron microscope micrographs of the optical films manufactured in the first embodiment, the second embodiment, and the third embodiment, respectively. They mainly represent particle size distributions of the barium titanate nanoparticles in the first embodiment, the second embodiment, and the third embodiment.

In addition, an embodiment of the present application further provides a comparative embodiment, which mixes quantum dots and the acrylic adhesive in a mass ratio of 1:100 and forms the mixture into the optical film with the thickness of 110 microns by the coating equipment. The optical films obtained in the first embodiment, the second embodiment, the third embodiment, and the comparative embodiment are tested, and the following Table 1 is obtained.

TABLE 1

Comparison of Brightness of Optical Films

| Sample | Brightness (cd/m$^2$) |
|---|---|
| First Embodiment | 1021.4 |
| Second Embodiment | 980.4 |
| Third Embodiment | 1104.8 |
| Comparative Embodiment | 597.2 |

It can be seen from Table 1 that compared with the comparative embodiment, the brightness of the optical films manufactured in the first embodiment, the second embodiment, and the third embodiment according to embodiment of the present application is greatly increased by about twice. Therefore, the optical films obtained by the manufacturing method provided by the embodiments of the present application can reduce the content of the quantum dots and increase the brightness of the optical film at the same time, thereby increasing an application range of the optical film.

An embodiment of the present application further provides an optical film, which is obtained by the manufacturing method provided by the above embodiments, that is, the optical film is distributed with the barium titanate nanoparticles.

In summary, the optical film obtained by the manufacturing method provided by an embodiment of the present application can be applied in a display device. The manufacturing method provided by an embodiment of the present application avoids using the barium hydroxide to prepare the barium titanate nanoparticles like the prior art, which is not conducive to the dispersion of the barium titanate nanoparticles in the organic adhesive. Because the barium titanate nanoparticles prepared from the barium hydroxide are hydrophilic, they cannot be used in the optical film. However, an embodiment of the present application uses the barium source to prepare the barium titanate nanoparticles and modifies the surfaces of the barium titanate nanoparticles with organic carbon chains, so as to increase the compatibility of the barium titanate nanoparticles in the organic adhesive, thereby obtaining the uniform optical film. Due to the brightness enhancement of the barium titanate nanoparticles, the brightness and the optical performance of the optical film are increased when the content of the quantum dots is reduced. Also, due to the scattering effect of the barium titanate nanoparticles, the direct transmission of the blue light through the film is reduced, and the back and forth reflection of the blue light in the optical film is increased. In this way, the quantum dots fully absorb the blue light, so that the quantum dots in the film are fully excited, thereby increasing a brightness of the optical film.

In the above embodiments, the descriptions of the various embodiments are different in emphases, for contents not described in detail, please refer to related description of other embodiments.

The manufacturing method of the optical film and the optical film provided by embodiments of the present application are described in detail above, and the description of embodiments above is only for helping to understand technical solutions of the present application and its core idea. Understandably, for a person of ordinary skill in the art can make various modifications of the technical solutions of the embodiments of the present application above. However, it does not depart from the scope of the technical solutions of the embodiments of the present application.

What is claimed is:

1. A manufacturing method of an optical film, comprising steps of:
    step S10, mixing titanium source precursors and a barium source and adding an alkaline agent for a reaction to obtain nanoparticles; and
    step S20, mixing quantum dots, an organic adhesive, and the nanoparticles followed by coating to obtain the optical film.

2. The manufacturing method of the optical film according to claim 1, wherein in step S10, the titanium source precursors comprise tetrabutyl titanate;
    the barium source comprises barium carboxylate or barium acetylacetonate; and
    the alkaline agent comprises potassium hydroxide, sodium hydroxide, or ammonia solution.

3. The manufacturing method of the optical film according to claim 2, wherein the barium carboxylate comprises barium myristate, barium palmitate, barium octadecenoate, or barium oleate.

4. The manufacturing method of the optical film according to claim 1, wherein step S10 further comprises:
    dissolving the titanium source precursors in a first solvent to form a first solution;
    dissolving the barium source in a second solvent to form a second solution; and
    mixing the first solution and the second solution.

5. The manufacturing method of the optical film according to claim 4, wherein the first solvent and the second solvent are independently selected from one of dodecanethiol, oleic acid, oleylamine, ethylene glycol, ethanol, ultrapure water, or octadecene.

6. The manufacturing method of the optical film according to claim 1, wherein in step S10, a molar ratio of barium element in the barium source to titanium element in the titanium source precursors ranges from 0.5 to 1.5.

7. The manufacturing method of the optical film according to claim 1, wherein in step S20, the quantum dots comprise indium phosphide quantum dots, perovskite quantum dots, indium copper sulfide quantum dots, silver sulfide quantum dots, lead sulfide quantum dots, or lead selenide quantum dots; and
    material of the organic adhesive comprises an acrylic material or an epoxy resin material.

8. The manufacturing method of the optical film according to claim 1, wherein in step S20, a mass ratio of the quantum dots to the organic adhesive ranges from 0.1:100 to 5:100; and
    a mass ratio of the nanoparticles to the organic adhesive is 5:100.

9. The manufacturing method of the optical film according to claim 1, wherein step S20 comprises: forming a first organic layer, coating a mixed layer on the first organic layer, and forming a second organic layer on the mixed layer, wherein the mixed layer is obtained by mixing the quantum dots, the organic adhesive, and the nanoparticles.

10. An optical film, comprising: a mixed layer formed by mixing the quantum dots, the organic adhesive, and nanoparticles, wherein the nanoparticles is obtained by mixing titanium source precursors and a barium source and adding an alkaline agent for a reaction;

the optical film further comprising a first organic layer, and a second organic layer, and the first organic layer, the mixed layer, and the second organic layer are stacked;

material of each of the first organic layer and the second organic layer comprises polyethylene terephthalate.

11. The optical film according to claim 10, wherein the quantum dots comprise indium phosphide quantum dots, perovskite quantum dots, indium copper sulfide quantum dots, silver sulfide quantum dots, lead sulfide quantum dots, or lead selenide quantum dots; and material of the organic adhesive comprises an acrylic material or an epoxy resin material.

* * * * *